United States Patent [19]

Puerto

[11] Patent Number: 5,135,052
[45] Date of Patent: Aug. 4, 1992

[54] RECOVERY OF OIL USING MICROEMULSIONS

[75] Inventor: Maura C. Puerto, Houston, Tex.

[73] Assignee: Exxon Production Research Company, Houston, Tex.

[21] Appl. No.: 676,958

[22] Filed: Mar. 28, 1991

[51] Int. Cl.$^5$ .............................................. E21B 43/22
[52] U.S. Cl. .................................. 166/252; 166/275; 252/8.554
[58] Field of Search ............... 166/273, 274, 275, 252; 252/8.554

[56] References Cited

U.S. PATENT DOCUMENTS

| | | |
|---|---|---|
| 945,711 | 1/1910 | Fink . |
| 1,875,001 | 8/1932 | Hoel . |
| 2,008,419 | 7/1935 | Herman . |
| 2,012,611 | 8/1935 | Lenher et al. . |
| 3,208,518 | 9/1965 | Patton .............................. 166/275 X |
| 3,504,744 | 4/1970 | Davis, Jr. et al. ................... 166/252 |
| 3,578,082 | 5/1971 | Davis, Jr. et al. ................... 166/252 |
| 3,753,465 | 8/1973 | Denekas .............................. 166/252 |
| 3,885,628 | 5/1975 | Reed et al. .......................... 166/252 |
| 3,888,308 | 6/1975 | Gale et al. .......................... 166/273 |
| 3,981,361 | 9/1976 | Healy .................................. 166/252 |
| 3,983,940 | 10/1976 | Carpenter, Jr. et al. ............ 166/273 |
| 3,994,342 | 11/1976 | Healy et al. ........................ 166/273 |
| 4,013,125 | 3/1977 | Plummer et al. ................. 166/275 X |
| 4,240,504 | 12/1980 | Reed .................................... 166/273 |
| 4,271,907 | 6/1981 | Gale .................................. 166/275 X |
| 4,300,635 | 11/1981 | Glinsmann .......................... 166/274 |
| 4,392,865 | 7/1983 | Grosse et al. .......................... 44/51 |
| 4,549,607 | 10/1985 | Morita et al. ....................... 166/274 |

FOREIGN PATENT DOCUMENTS 2053325 2/1981 United Kingdom .

OTHER PUBLICATIONS

*Aqueous Surfactant Systems for Oil Recovery*, Hill et al., 1983.
*Physicochemical Aspects of Microemulsion Flooding*, Healy et al., 1974.
*Multiphase Microemulsion Systems*, Healy et al., 1976.
*Immiscible Microemulsion Flooding*, Healy et al., 1977.
*Estimation of Optional Salinity and Solubilization Parameters for Alkylorthoxylene Sulfonate Mixtures*, Puerto et al., 1977.
*Surfactant Phase Behavior and Retention in Porous Media*, Glover et al., 1979.
*Experimental Investigation of the Effects of Temperature, Pressure, and Crude Oil Composition on Interfacial Properties*, Hjelmeland et al., 1983.
*A Three-Parameter Representation of Surfactant/Oil/Brine Interaction*, Puerto et al., 1983.
*Loudon Surfactant Flood Pilot-Overview and Update*, Bragg et al., 1983.
*Surfactant Selection Using the Three Parameter Diagram*, Puerto et al., 1985.

Primary Examiner—George A. Suchfield
Attorney, Agent, or Firm—Pravel, Gambrel, Hewitt, Kimball & Krieger

[57] ABSTRACT

A method of recovering hydrocarbons from subterranean reservoirs by the use of a viscous microemulsion form the single phase region of the ternary diagram of a microemulsion system that is optimal at the reservoir salinity is disclosed. The microemulsion is obtained by first determining the reservoir salinity and viscosity, then determining the oil molar volume that corresponds to a microemulsion having the reservoir viscosity, then determining the oil or mixture of oils that correspond both to the oil molar volume determined above and the reservoir salinity. The oil is then used to create a microemulsion within the single phase region of an optimal microemulsion.

7 Claims, 3 Drawing Sheets

OPTIMAL PHASE DIAGRAM

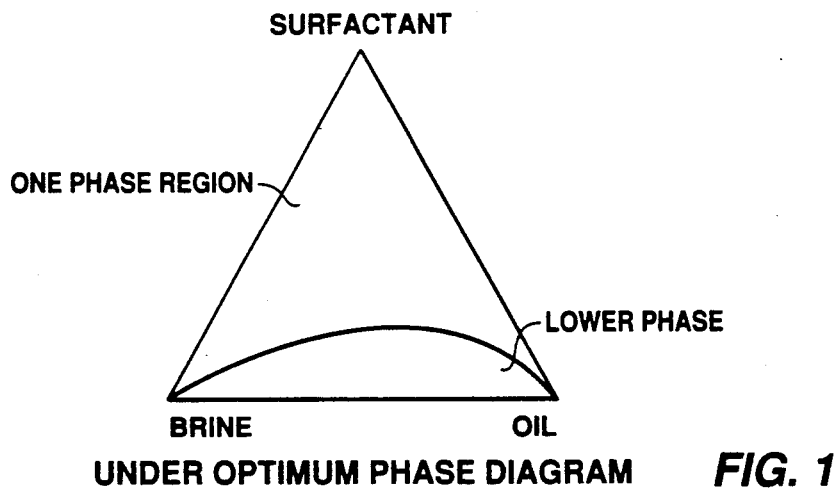
FIG. 1 UNDER OPTIMUM PHASE DIAGRAM
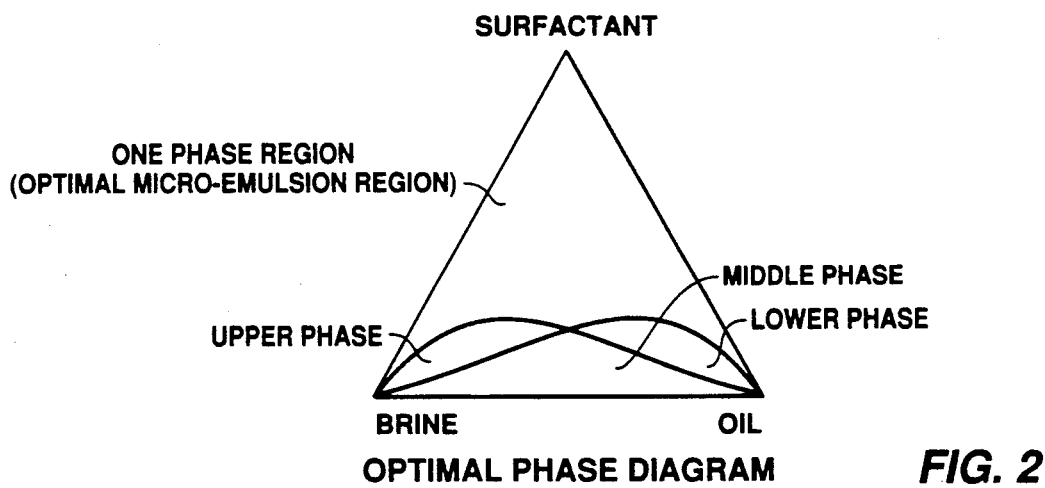
FIG. 2 OPTIMAL PHASE DIAGRAM
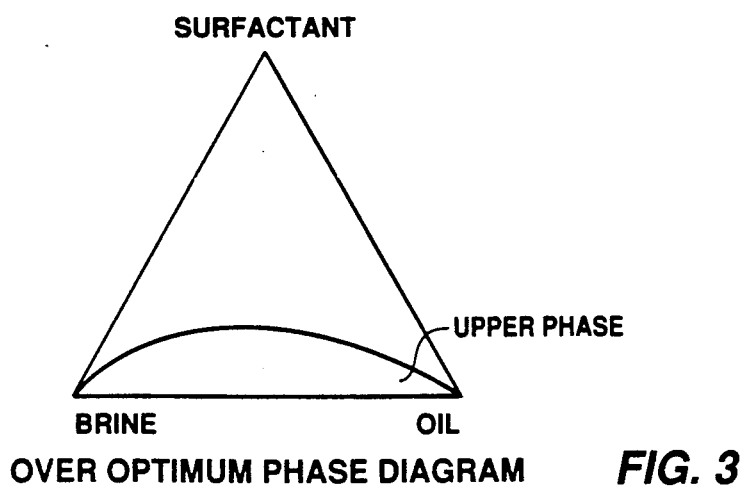
FIG. 3 OVER OPTIMUM PHASE DIAGRAM

RECOVERY OF OIL USING MICROEMULSIONS

BACKGROUND OF THE INVENTION

1. Field of the Invention

This invention relates to the recovery of hydrocarbons from subterranean formations through the use of microemulsions, and to microemulsion compositions. In an other aspect this invention relates to the recovery of hydrocarbons from subterranean formations by utilizing optimal microemulsions comprising a hydrocarbon or hydrocarbon mixture, an aqueous solution, and at least one surfactant. In still another aspect this invention relates to microemulsions from the single phase region in the ternary diagram of an optimal microemulsion system at the reservoir salinity, that are useful in the recovery of hydrocarbons from a subterranean formation wherein the microemulsion comprises a hydrocarbon or hydrocarbon mixture tailored for the formation based on viscosity criteria, an aqueous solution, and at least one surfactant.

2. Description of the Related Art

Hydrocarbons are produced from subterannean formations by a variety of methods. "Primary recovery" techniques refer to those techniques that utilize only the initial formation energy to recover the hydrocarbons in the subterranean formation, and include natural flow, gas lifting, gas pressurization, and pumping methods. However it has long been known in the petroleum industry that primary recovery techniques are only capable of producing a small fraction of the original oil in place in the reservoir. Consequently there have been developed the so called "secondary and tertiary recovery" techniques, or "enhanced oil recovery" ("EOR") techniques, which have as their primary purpose the recovery of additional quantities of hydrocarbons known to be present in the reservoir, after the naturally occurring forces have declined in their ability to expel oil.

One of the most economical and perhaps most practiced of the EOR techniques is waterflooding. In waterflooding, an aqueous solution is injected into the reservoir through one or more injection wells to drive the hydrocarbons to one or more offset production wells. However, even after a typical waterflood the reservoir may retain a great portion of its original oil in place. It is well known that much of the retained oil in the reservoir after a typical waterflood is in the form of discontinuous globules or discrete droplets which are trapped in the pore spaces of the reservoir. The high normal interfacial tension between the reservoir water and oil prevents these discrete droplets from deforming to pass through narrow constrictions in the pore channels. Consequently, surface-active agents or surfactants have been added to the flood water solution to lower the interfacial tension between the water and the oil and thereby allow the oil droplets to deform and flow with the injected flood water. It is generally conceded that the interfacial tension between the oil and water must be reduced from the normal reservoir interfacial tension which is on the order of about 20 dyne/cm to less than 0.1 dyne/cm for effective recovery.

However, as effective as conventional surfactant waterflooding may be in recovering a portion of the remaining oil from subterranean formations, it is not without its shortcomings which detract seriously from its value. In general the major drawback with the use of surfactants in general is the tendency of the surfactants to be deleted from the injected waterflood solution. This depletion is thought to occur in at least one of several ways. For example, it is possible that at least a portion of the surface-active agents or surfactants may be adsorbed on the porous surface of the reservoir, or physically entrapped within the pore spaces of the reservoir matrix. It is also known that many surfactants react with ionic substances in the formation and are precipitated. Such depleted surfactants, whether adsorbed, entrapped, reacted or precipitated are unable to interact at the oil/water interface to reduce the interfacial tension. Consequently the oil recovery efficiency of the waterflood is reduced due to the surfactant depletion.

One method for reducing surfactant depletion and increasing the efficiency of the recovery is by the use of microemulsions. Microemulsions are well known (see for example U.S. Pat. No. 3,254,714, Gogarty et al, issued June 1966, and U.S. Pat. No. 3,981,361 , Healy, issued Sep. 21, 1976) and are mixtures of oil, water, and a surfactant.

FIGS. 1, 2 and 3 show phase diagrams for water-oil-surfactant systems and the effect of salinity on phase behavior. Healy et al, in "Multiphase Microemulsion Systems", discloses that microemulsion floods conducted at "optimal salinity" would recover more oil than otherwise, and the at "optimal salinity", the microemulsion phase diagram will resemble the phase diagram shown in FIG. 2. Thus to maximize oil recovery, it is desirable to use such optimal microemulsions. However, in many cases, an optimal microemulsion system will have too low of a viscosity for use in the formation, and viscosity is closely tied to mobility control.

Without proper mobility control the injected fluid will tend to finger through the reservoir and bypass a substantial portion of the oil. In other words, as the injected fluid travels through the reservoir between the injection wells and the production wells, it contacts less than the total volume of the reservoir within the injection well-production well pattern. The fraction of the volume of the reservoir that is swept by the injected fluid is termed the "sweep efficiency" and is expressed as a percentage of the total reservoir volume in the pattern. The sweep efficiency of a typical waterflood or surfactant waterflood may typically be less than 75 percent when the waterflood reaches its economic limit, thus one quarter or more of the reservoir may not have been contacted by the injected fluid by the end of the flooding operation.

Low flooding operation sweep efficiency is usually explained by the fact that the injected fluid has the ability to move through the reservoir at a much faster rate that the oil which it is displacing. The fingering and bypassing tendencies of the injected fluid are due in part to its relatively low viscosity.

A number of procedures have been suggested to date for improving conventional and surfactant waterflooding to reduce the degree of fingering and bypassing and to increase the sweep efficiency. These suggestions relate to the incorporation of a viscosity imparting agents, generally polymeric material, into the waterflood to increase the viscosity of the flood water, or the use of certain surfactants (see for example U.S. Pat. No. 3,753,465, issued Aug. 21, 1973).

The addition of other surfactants or other viscosifying agents to the microemulsion, while increasing the viscosity of the microemulsion, is not without its problems. As stated earlier, surfactants suffer from depletion. Some of the viscosity imparting agents have a tendency to plug the formation, some are unstable, some have relatively little thickening effect, and most do not have the ability to lower the interfacial between the oil and water to desired levels. Additionally many of the surfactants and viscosity imparting agents are quite expensive and their use is not economically feasible. In many instances, the polymers and surfactants are incompatible with each other at the optimal conditions.

However, the most important drawback of using other surfactants and viscosifying agents to control the viscosity of the optimum microemulsion, is that, the addition of these other materials to the microemulsion system, will have a tendency to change the phase behavior of the microemulsion. The system will generally change from the optimum microemulsion system as shown in FIG. 2 to either of the non-optimum systems as shown in FIGS. 1 and 3. In other instances, even if the addition of these other materials does not change the system to a non-optimum system, the addition of there viscosifying agents will many times change the single phase microemulsion to a multiphase microemulsion.

Thus there exists a need to improve the efficiency of EOR techniques utilizing microemulsions from the single phase region in the ternary diagram of an optimum microemulsion system by providing a technologically and economically feasible method of increasing the viscosity of a single phase optimum microemulsion without negatively altering the phase behavior of the system, and without shifting the system to a non-optimum system.

SUMMARY OF THE INVENTION

According to one embodiment of the invention there is provided a method of recovering hydrocarbons from a subterranean reservoir formation containing formation hydrocarbons and formation water comprising:

(a) determination of the effective or apparent reservoir water/hydrocarbon bank viscosity and the reservoir salinity;

(b) determination of the proper oil molar volume for a microemulsion having at least the effective or apparent reservoir water/hydrocarbon bank viscosity by using a correlation between microemulsion viscosity and oil molar volume for oils to be used to create a microemulsion;

(c) determination of the proper oil or mixture of oils for an optimal microemulsion corresponding to the value of oil molar volume determined above, and the reservoir salinity by using a correlation between optimal salinity and oil molar volume for the oils to be used to create a microemulsion;

(d) tailoring a microemulsion in the one phase region of the ternary diagram of an optimum microemulsion system that is optimum at the reservoir salinity, wherein the microemulsion comprises the oil or mixture of oils as determined in step (c), an aqueous medium; and a surfactant in an amount sufficient to produce a microemulsion;

(e) injecting the microemulsion into the formation through at least one injection means to displace the hydrocarbons toward at least one production means, and recovering hydrocarbons with the production means.

According to another embodiment of the invention there is provided a microemulsion for use in producing hydrocarbons from a subterranean reservoir containing reservoir formation hydrocarbons and water wherein the microemulsion is in the one phase region of the ternary diagram of a system that is optimum at the reservoir salinity and the microemulsion comprises:

(a) oil or mixture of oils having an oil molar volume at the reservoir salinity that corresponds to the effective or apparent reservoir water/hydrocarbon bank viscosity;

(b) an aqueous medium; and, (c) a surfactant in an amount sufficient to produce a microemulsion;

BRIEF DESCRIPTION OF THE DRAWINGS

FIG. 1 is a ternary diagram of an under optimum microemulsion system, showing the one-phase region, and the two-phase excess water region.

FIG. 2 is a ternary diagram of an optimum microemulsion system, showing the one-phase region, the two-phase excess water region, the two-phase excess oil region, and the three-phase region.

FIG. 3 is a ternary diagram of an over optimum microemulsion system, showing the one-phase region, and the two-phase excess oil region.

DETAILED DESCRIPTION OF THE INVENTION

Figure 4:
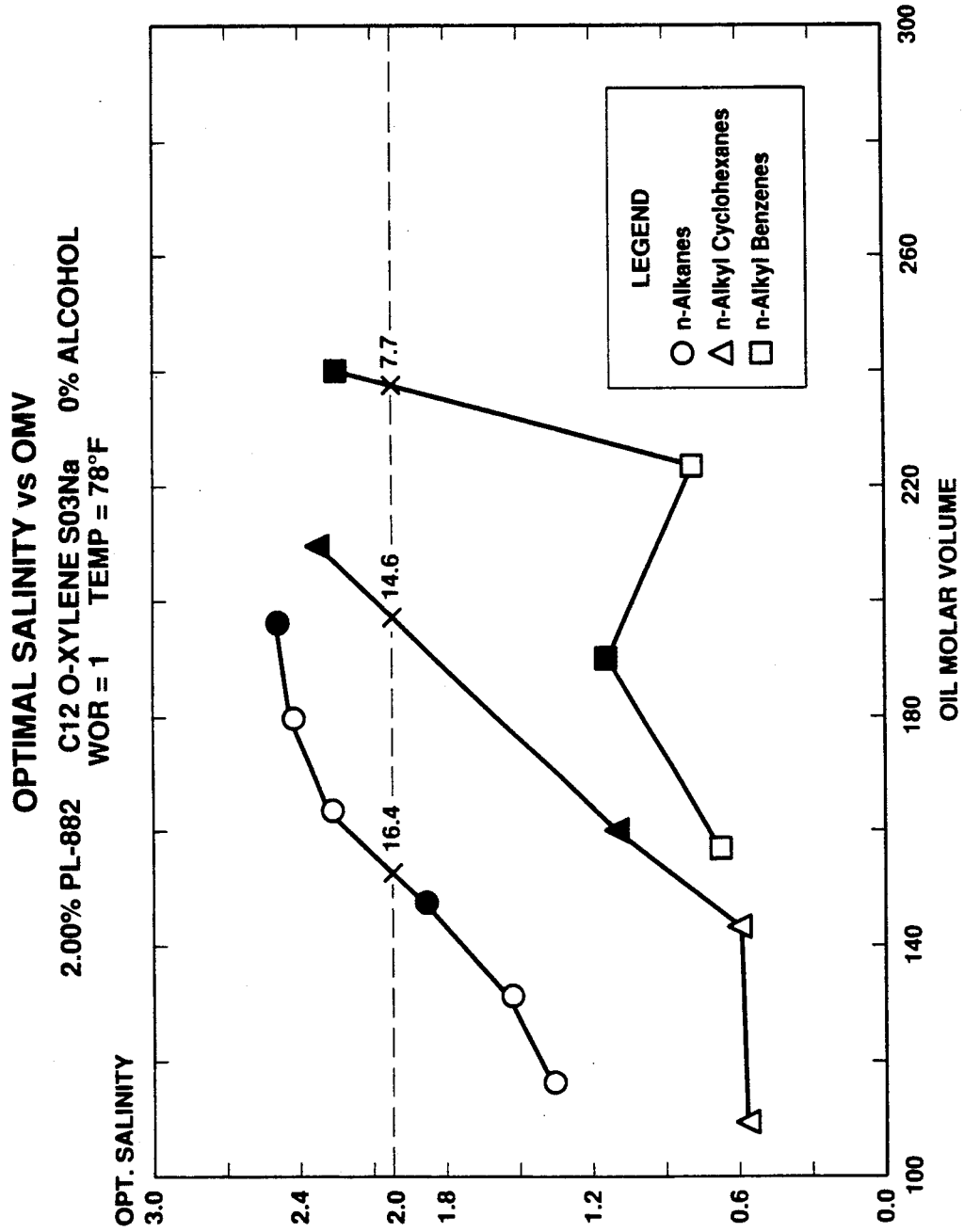
FIG. 4 is a plot showing the relationship between optimal salinity and oil molar volume for n-alkanes, n-alkylcyclohexanes, and n-alkylbenzenes.

Microemulsions are stable, transparent or translucent micellar solutions comprising a liquid hydrocarbon, an aqueous liquid, and a surfactant. Generally microemulsions may be oil external, water-external or middle phase. However, microemulsions of the present invention are selected from the single phase region of the ternary diagram of an optimal microemulsion system.

In FIGS. 1, and 2 every compositional point within the single phase region above the binodal curve corresponds to a microemulsion; but micellar structure may vary with location. Compositional points below the binodal curve correspond to multiple phases, comprising, in general, microemulsions of various kinds, excess oil, and excess water; therefore, opaque emulsions of these are observed upon mixing.

FIG. 1 shows a two-phase region wherein microemulsions along the binodal curve are in equilibrium with excess water. This system is at an under optimal salinity. FIG. 3 shows a two phase region wherein microemulsions along the binodal curve are in equilibrium with oil containing molecularly dispersed surfactant (excess oil). This system is at an over optimal salinity.

The microemulsion systems of the present invention have ternary phase diagrams which resemble FIG. 2. In FIG. 2 every compositional point within the single phase region above the binodal curve corresponds to a microemulsion; but micellar structure may vary with location. The upper-right node corresponds to an excess-oil multiphase region like the multiphase region in FIG. 3. The upper-left node corresponds to an excess-water region much like the multiphase region in FIG. 1. Any composition in the lower triangle (middle phase) region of FIG. 2 equilibrates into three phases: microemulsions corresponding to compositional point M, excess water, and excess oil.

The microemulsions of the present invention are selected from the single phase region of a ternary diagram of an optimal microemulsion system as shown in FIG. 2. Preferably, the amount of surfactant and oil is minimized, and the single phase optimal microemulsion can take up additional quantities of oil or water without phase separation. Such a microemulsion will preferably come from the one-phase region on FIG. 2 that is just above the two-phase excess oil region at high water composition.

The microemulsions of the present invention are single phase optimal microemulsions at the reservoir salinity with viscosities approximating the apparent or effective reservoir water/oil bank viscosity. The present invention is not limited to any particular method of determining the reservoir salinity or the effective reservoir water/hydrocarbon bank viscosity, and these can be determined by any method. However, the effective reservoir water/hydrocarbon bank viscosity is generally calculated from the reservoir water viscosity and the reservoir hydrocarbon viscosity. Once the effective viscosity of the reservoir water/hydrocarbon bank is known, this value sets the minimum microemulsion viscosity. If the viscosity of the microemulsion is too low it will tend to finger through the reservoir. It must be remembered that when the microemulsion viscosity exceeds the effective reservoir water/hydrocarbon bank viscosity by too much, excessive energy will be used in displacing the microemulsion through the reservoir. Thus the microemulsion viscosity must be high enough so that microemulsion fingering through the reservoir is minimized, but not so high as to require excessive displacement energy. Generally the viscosity of the microemulsion should not exceed the reservoir viscosity by more than about 20 percent.

Figure 5:
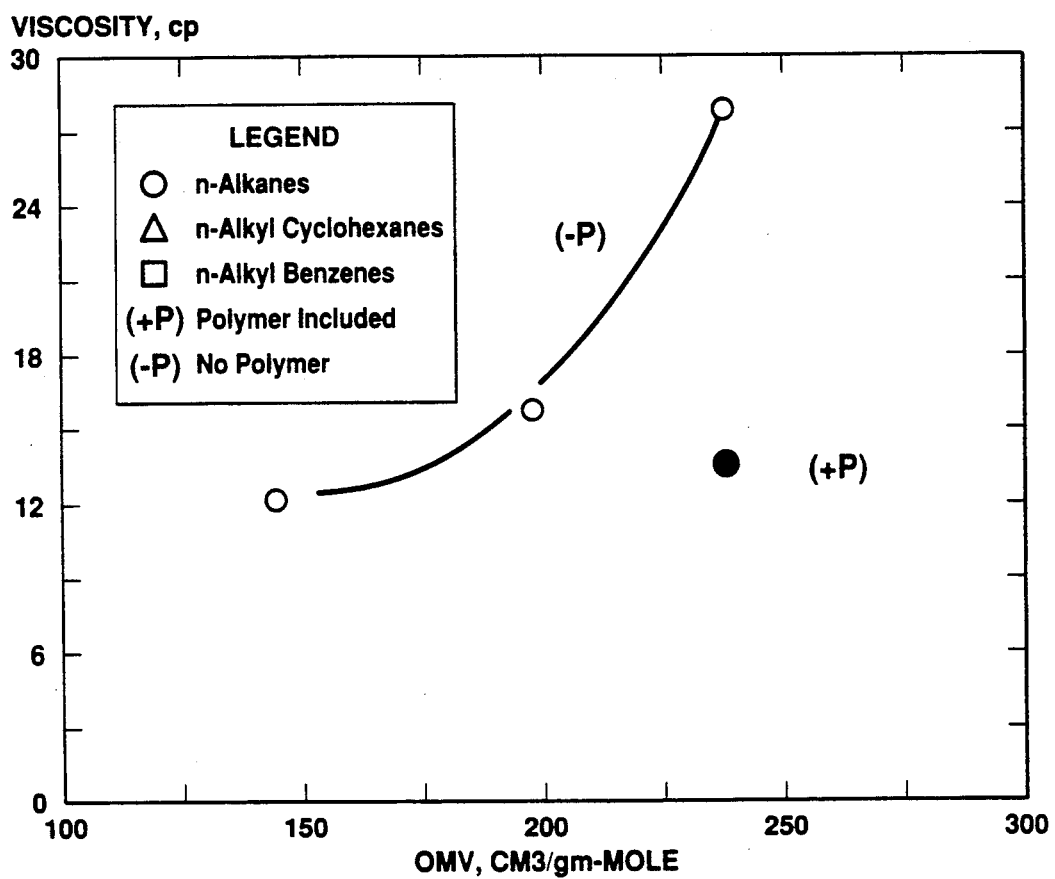
FIG. 5 is a plot showing the relationship between oil molar volume and viscosity for n-alkanes, n-alkylcyclohexanes, and n-alkylbenzenes.

Once the effective reservoir water/hydrocarbon bank viscosity is determined, the oil molar volume that corresponds to a microemulsion having a viscosity of at least the effective reservoir water/hydrocarbon bank viscosity must be determined. FIG. 5 shows the relationship between microemulsion viscosity and oil molar volume for n-alkanes, n-alkylcyclohexanes, and n-alkylbenzenes.

Once the oil molar volume value is determined, then the proper oil or mixture of oils can be determined by using the relationship between optimal salinity and oil molar volume for various oils. FIG. 4 shows such a relationship between oil molar volume and optimal salinity for n-alkanes, n-alkylcyclohexanes, and n-alkylbenzenes. The oil molar volume determined earlier, and the reservoir salinity are now used to find a suitable oil or mixture of oils for the microemulsion.

The microemulsion of the present invention is not limited to any particular type of oil or blend of oils. Generally, the oil portion of the microemulsions utilized in the method of the present invention can comprise any conventionally utilized crude oil, both sweet and sour, as well as refined oils, e.g., side cuts from crude columns, crude column overheads, gas oils, kerosene, heavy naphthas, naphthas, straight run gasolines as well as commercially available refined aromatic and paraffinic hydrocarbons. The oil portion of the microemulsions can of course comprise blends of any of the foregoing including blends of crude and refined or partially refined oils.

The microemulsion of the present invention is not limited to any particular surfactant or type of surfactant, or combination of surfactants, and any of the surfactants conventionally employed in surfactant flooding or microemulsions flooding can be advantageously utilized in the microemulsions and method of the present invention, provided that a single phase microemulsion is formed whose composition falls within the single phase region of the ternary diagram of a microemulsion system that is optimum at the reservoir salinity. For example, the surfactants applicable in accordance with the present invention can be any of those which are described in the following nonlimiting list of U.S. Pat. Nos. 3,254,714; 3,301,325; 3,330,344; 3,368,621; 3,455,386; 3,348,611; 3,455,385; 3,455,389; 3,443,635; 3,443,636; 3,406,754; 3,261,399; 3,297,985; 3,480,080; 3,478,823; 3,477,511; and 3,469,630.

The surfactants utilized in the microemulsions of the present invention can be anionic, nonionic, and/or cationic in character with the particularly applicable surfactants being petroleum and synthetic sulfonates as well as polyoxyalkylated organic materials and sulfates thereof. Anionic sulfonate surfactants can be illustrated by metal or ammonium salts of sulfonate surfactants, e.g., alkali metal or ammonium salts of sulfonated petroleum hydrocarbons such as alkylated naphthalene sulfonates, alkylated benzene sulfonates; or the sulfocarboxylate salts, and the like.

With regard to the amounts or concentrations of the three essential components of the composition, i.e. oil, water and surfactant, it is pointed out that it is merely necessary for the surfactant to be present in a concentration in excess of the critical micelle concentration so as to allow formation of the microemulsion. An amount of from about 0.1 to about 20% by volume based on the volume of the microemulsion is generally applicable.

With respect to the concentration of oil and water in the microemulsions it is pointed out that no limitations are placed thereon except the obvious limitation that the amount of oil and water must be such that the composition falls within the single phase region of the ternary diagram of a microemulsion system that is optimum at the reservoir salinity. With these guidelines it is obvious that the selection of any particular concentration of oil and water to meet particular requirements can be easily carried out, it being noted that the objects and advantages of the present invention are achieved when the composition of oil, water, and surfactant falls within the single phase region of the ternary diagram of a microemulsion system that is optimum at the reservoir salinity and are injected into the subterranean formation so as to effectively recover the crude oil present therein.

The particular weight percentages of the main components in microemulsion (water, oil, surfactant) of the present invention can be any range of values as long as the microemulsion is within the single phase region of the ternary diagram of a microemulsion system that is optimum at the reservoir salinity. However, generally for economic reasons it is preferable to minimize the amounts of oil and surfactant and maximize the amount of water in the microemulsion. Therefore, the oil portion of the microemulsion will generally comprise in the range of about 0.05 weight percent to about 30 weight percent of the microemulsion, preferably in the range of about 0.2 weight percent to about 10 weight percent, and most preferably in the range of about 0.5 weight percent to about 4 weight percent. The surfactant generally comprises in the range of about 0.05 weight percent to about 10 weight percent of the microemulsion, preferably in the range of about 0.2 weight percent to about 4 weight percent, and most preferably in the range of about 0.5 weight percent to about 2 weight percent. Water will generally comprise the balance of the microemulsion.

In addition to the essential components, the microemulsions of this invention may also contain additional electrolytes in order to give a microemulsion system whose aqueous component has a salinity which is similar to the salinity of the reservoir brine, provided of course that the phase behavior of the microemulsion is not substantially changed, and a single phase microemulsion is formed whose composition falls within the single phase region of the ternary diagram of a microemulsion system that is optimum at the reservoir salinity. This may require the addition of electrolytes such as sodium chloride and other alkali metal or ammonium salts of anions such as chlorides, sulfates, nitrates, carbonates, phosphates, or the like and mixtures thereof in order to result in an aqueous component having a composition similar to that of the reservoir brine.

The microemulsions of the present inventions may also be utilized with other agents, again provided that the phase behavior of the microemulsion is not substantially changed, and a single phase microemulsion is formed whose composition falls within the single phase region of the ternary diagram of a microemulsion system that is optimum at the reservoir salinity. Other possible agents that do not induce phase separation may be added. These include, viscosity increasing agents, thickeners, or mobility control agents such as, for example, polymers, fatty acid soaps, sucrose, detran, amine, glycerine, gums, and sulfonated hydrocarbons.

EXAMPLES

FIG. 4 was generated by conducting salinity-scan tests against oils of different oil molar volumes. The optimal salinites of the example surfactant, C12-orthoxylene sulfonate, are plotted in FIG. 4. Test results similar to that in FIG. 4 can be used to appropriately select an oil that will impart a desired viscosity to the microemulsion in question. A horizontal line across FIG. 4 represents all the oils that will produce optimal microemulsions at the selected salinity. For example in FIG. 4, the dotted line across a constant 2% NaCl represent all the oils that will produce optimal microemulsions at 2% NaCl.

Example of how to find an oil that produce optimal microemulsion of not less than 16 centipoises if the reservoir temperature is 78° F. and reservoir salinity is equivalent to 2% NaCl. First, find oil blends that produce optimal microemulsion at the reservoir salinity of 2% NaCl; FIG. 4 discloses three oil blends that meet this condition. Oil blend (I) is a mixture of n-heptane and n-decane (close circles). The surfactant solubilized 16.4 volumes of oil per volume of surfactant. Oil blend (2) is a mixture of propylcyclohexane and hexylcyclohexane (closed triangles). The surfactant solubilized 14.6 volumes of oil per volume of surfactant. Oil blend (3) is a mixture of phenylhexane and phenyl nonane (closed squares). The surfactant solubilized 7.7 volumes of oil per volume of surfactant. Second, prepare low oil content microemulsions and measure the viscosities. These viscosities are plotted in FIG. 5. These microemulsions comprise of 2.5% surfactant, two to six percent oil and brine of 2% NaCl. The solid point in FIG. 5 corresponds to a non-optimal microemulsion viscosified with a xanthan gum polymer. The microemulsions from oil blends (2) and (3) produced optimal microemulsions with desired viscosities.

I claim:

1. A method of recovering hydrocarbons from a subterranean reservoir formation containing formation hydrocarbons and formation water comprising:
   (a) determining the effective reservoir water/hydrocarbon bank viscosity and the reservoir salinity;
   (b) determining the proper oil molar volume for a microemulsion having at least the effective reservoir water/hydrocarbon bank viscosity by using a correlation between microemulsion viscosity and oil molar volume for oils to be used to create a microemulsion;
   (c) determining the proper oil or mixture of oils to be used to create an optimal microemulsion corresponding to both the value of oil molar volume and the reservoir salinity of steps (a) and (b) by using a correlation between optimal salinity and oil molar volume;
   (d) tailoring a microemulsion in the one phase region of the ternary diagram of an optimum microemulsion system that is optimum at the reservoir salinity, wherein the microemulsion comprises the oil or mixture of oils as determined in step (c); an aqueous medium; and a surfactant in an amount sufficient to produce a microemulsion;
   (e) injecting the microemulsion into the formation through at least one injection means to displace the hydrocarbons toward at least one production means, and recovering hydrocarbons with the production means.

2. The method of claim 1 wherein the oil portion of the microemulsion comprises in the range of about 0.5 weight percent to about 15 weight percent of the microemulsion, the water portion of the microemulsion generally comprises in the range of about 85 weight percent to about 95 weight percent of the microemulsion, and the surfactant generally comprises in the range of about 0.5 weight percent to about 10 weight percent of the microemulsion.

3. The method of claim 1 wherein the oil or mixture of oils is selected from the group consisting of crude oil and refined oils and blends thereof, wherein the refined oils are selected from the group consisting of side cuts from crude columns, crude column overheads, gas oils, kerosene, heavy naphthas, naphthas, straight run gasolines, refined aromatic and paraffinic hydrocarbons, and blends thereof.

4. The method of claim 1 wherein the oil or mixture of oils is selected from the group consisting of n-alkanes, n-alkyl cyclohexanes, n-alkyl benzenes, and blends thereof.

5. The method of claim 1 wherein the surfactant is selected from the group consisting of anionic, nonionic, and cationic surfactants.

6. The method of claim 5 wherein the anionic surfactants are selected from the group of anionic sulfonate surfactants consisting of metal salts of sulfonate surfactants, ammonium salts of sulfonate surfactants, and combinations thereof.

7. The method of claim 1 wherein the surfactant is selected from the group consisting of petroleum sulfonates, synthetic sulfonates, polyoxyalkylated organic materials, sulfates of polyoxyalkylated organic materials, and blends thereof.

* * * * *